(12) United States Patent
Deraison

(10) Patent No.: US 8,839,442 B2
(45) Date of Patent: *Sep. 16, 2014

(54) SYSTEM AND METHOD FOR ENABLING REMOTE REGISTRY SERVICE SECURITY AUDITS

(71) Applicant: Tenable Network Security, Inc., Columbia, MD (US)

(72) Inventor: Renaud Deraison, New York, NY (US)

(73) Assignee: Tenable Network Security, Inc., Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/665,077

(22) Filed: Oct. 31, 2012

(65) Prior Publication Data

US 2014/0013436 A1 Jan. 9, 2014

Related U.S. Application Data

(63) Continuation of application No. 12/695,659, filed on Jan. 28, 2010, now Pat. No. 8,302,198.

(51) Int. Cl.
*H04L 29/06* (2006.01)
*G06F 21/57* (2013.01)

(52) U.S. Cl.
CPC .......... *G06F 21/577* (2013.01); *H04L 63/1433* (2013.01)
USPC ........................................................ 726/25

(58) Field of Classification Search
None
See application file for complete search history.

(56) References Cited

U.S. PATENT DOCUMENTS

| | | | |
|---|---|---|---|
| 4,525,599 A | 6/1985 | Curran et al. | 178/22.08 |
| 5,541,997 A | 7/1996 | Pappas et al. | 380/49 |
| 5,572,729 A | 11/1996 | Giordano et al. | 395/616 |
| 5,715,391 A | 2/1998 | Jackson et al. | 395/200.01 |
| 5,721,819 A | 2/1998 | Galles et al. | 395/200.15 |
| 5,838,919 A | 11/1998 | Schwaller et al. | 395/200.54 |
| 5,844,817 A | 12/1998 | Lobley et al. | 364/578 |
| 6,154,775 A | 11/2000 | Coss et al. | 709/225 |
| 6,266,774 B1 | 7/2001 | Sampath et al. | 713/201 |
| 6,269,447 B1 | 7/2001 | Maloney et al. | 713/201 |

(Continued)

OTHER PUBLICATIONS

Wack, John, et al., NIST Special Publication 800-42, "Guideline on Network Security Testing", Computer Security Division, National Institute of Standards and Technology, Oct. 2003, pp. 1-92.

(Continued)

*Primary Examiner* — William Goodchild
(74) *Attorney, Agent, or Firm* — Pillsbury Winthrop Shaw Pittman LLP

(57) ABSTRACT

The system and method for enabling remote registry service security audits described herein may include scanning a network to construct a model or topology of the network. In particular, the model or topology of the network may include characteristics describing various devices in the network, which may be analyzed to determine whether a remote registry service has been enabled on the devices. For example, the security audits may include performing one or more credentialed policy scans to enable the remote registry service for certain devices that have disabled the remote registry service, auditing the devices in response to enabling the remote registry service, and then disabling the remote registry service on the devices. Thus, the system and method described herein may enable remotely scanning information contained in device registries during a security audit without exposing the device registries to malicious activity.

17 Claims, 9 Drawing Sheets

(56) References Cited

U.S. PATENT DOCUMENTS

| | | | |
|---|---|---|---|
| 6,324,656 B1 | 11/2001 | Gleichauf et al. | 714/37 |
| 6,393,568 B1 | 5/2002 | Ranger et al. | 713/188 |
| 6,415,321 B1 | 7/2002 | Gleichauf et al. | 709/224 |
| 6,487,666 B1 | 11/2002 | Shanklin et al. | 713/201 |
| 6,499,107 B1 | 12/2002 | Gleichauf et al. | 713/201 |
| 6,510,509 B1 | 1/2003 | Chopra et al. | 712/13 |
| 6,606,663 B1 | 8/2003 | Liao et al. | 709/229 |
| 6,704,874 B1 | 3/2004 | Porras et al. | 713/201 |
| 6,711,127 B1 | 3/2004 | Gorman et al. | 370/230 |
| 6,789,202 B1 | 9/2004 | Ko et al. | 713/201 |
| 6,847,982 B2 | 1/2005 | Parker et al. | 707/200 |
| 6,873,617 B1 | 3/2005 | Karras | 370/389 |
| 6,882,728 B1 | 4/2005 | Takahashi et al. | 380/201 |
| 6,886,020 B1 | 4/2005 | Zahavi et al. | 707/204 |
| 6,952,779 B1 | 10/2005 | Cohen et al. | 713/200 |
| 6,957,348 B1 | 10/2005 | Flowers et al. | 713/201 |
| 6,968,377 B1 | 11/2005 | Gleichauf et al. | 709/224 |
| 7,017,186 B2 | 3/2006 | Day | 726/23 |
| 7,073,198 B1 | 7/2006 | Flowers et al. | 726/25 |
| 7,093,287 B1 | 8/2006 | Gusler et al. | 726/13 |
| 7,107,619 B2 | 9/2006 | Silverman | 726/27 |
| 7,120,148 B1 | 10/2006 | Batz et al. | 370/392 |
| 7,134,141 B2 | 11/2006 | Crosbie et al. | 726/23 |
| 7,139,819 B1 | 11/2006 | Luo et al. | 709/223 |
| 7,152,105 B2 | 12/2006 | McClure et al. | 709/224 |
| 7,162,742 B1 | 1/2007 | Flowers et al. | 726/25 |
| 7,181,769 B1 | 2/2007 | Keanini et al. | 726/23 |
| 7,237,264 B1 | 6/2007 | Graham et al. | 726/23 |
| 7,243,366 B2 | 7/2007 | Medvinsky et al. | 726/2 |
| 7,272,646 B2 | 9/2007 | Cooper et al. | 709/223 |
| 7,290,145 B2 | 10/2007 | Falkenthros | 713/182 |
| 7,310,687 B2 | 12/2007 | Psounis et al. | 709/247 |
| 7,324,551 B1 | 1/2008 | Stammers | 370/468 |
| 7,475,426 B2 | 1/2009 | Copeland, III | 726/23 |
| 7,509,681 B2 | 3/2009 | Flowers et al. | 726/25 |
| 7,587,761 B2 | 9/2009 | Duffield et al. | 726/22 |
| 7,594,273 B2 | 9/2009 | Keanini et al. | 726/25 |
| 7,653,647 B2 | 1/2010 | Borthakur et al. | 707/102 |
| 7,661,134 B2 | 2/2010 | Radatti | 726/22 |
| 7,735,100 B1 * | 6/2010 | Sallam | 719/330 |
| 7,739,377 B2 | 6/2010 | Benedetti et al. | 709/224 |
| 7,761,918 B2 | 7/2010 | Gula et al. | 726/23 |
| 7,904,479 B2 | 3/2011 | Zuk | 707/791 |
| 7,908,254 B2 | 3/2011 | Suermondt et al. | 707/698 |
| 7,926,113 B1 | 4/2011 | Gula et al. | 726/25 |
| 7,936,682 B2 | 5/2011 | Singh et al. | 370/241 |
| 7,966,358 B2 | 6/2011 | Deolalikar et al. | 708/250 |
| 8,069,484 B2 | 11/2011 | Mcmillan et al. | 726/23 |
| 8,135,815 B2 | 3/2012 | Mayer | 709/223 |
| 8,291,498 B1 | 10/2012 | Liang et al. | 726/24 |
| 8,302,198 B2 | 10/2012 | Deraison | 726/25 |
| 8,438,270 B2 | 5/2013 | Nappier et al. | 709/224 |
| 8,484,372 B1 | 7/2013 | Callon | 709/238 |
| 8,549,650 B2 | 10/2013 | Hanson | 726/25 |
| 2001/0034847 A1 | 10/2001 | Gaul, Jr. | 713/201 |
| 2002/0019945 A1 | 2/2002 | Houston et al. | 713/201 |
| 2002/0093527 A1 | 7/2002 | Sherlock et al. | 345/736 |
| 2002/0100023 A1 | 7/2002 | Ueki et al. | 717/127 |
| 2002/0107841 A1 | 8/2002 | Hellerstein et al. | 707/3 |
| 2002/0166063 A1 | 11/2002 | Lachman, III et al. | 713/200 |
| 2003/0051026 A1 | 3/2003 | Carter et al. | 709/224 |
| 2003/0056116 A1 | 3/2003 | Bunker et al. | 713/201 |
| 2003/0135517 A1 | 7/2003 | Kauffman | 707/103 R |
| 2003/0145225 A1 | 7/2003 | Bruton, III et al. | 713/201 |
| 2003/0196123 A1 | 10/2003 | Rowland et al. | 713/201 |
| 2004/0003266 A1 | 1/2004 | Moshir et al. | 713/191 |
| 2004/0015719 A1 | 1/2004 | Lee et al. | 713/201 |
| 2004/0034795 A1 | 2/2004 | Anderson et al. | 713/201 |
| 2004/0042470 A1 | 3/2004 | Cooper et al. | 370/401 |
| 2004/0193918 A1 | 9/2004 | Green et al. | 713/201 |
| 2005/0068928 A1 | 3/2005 | Smith et al. | 370/338 |
| 2005/0108578 A1 | 5/2005 | Tajalli et al. | 713/201 |
| 2005/0128988 A1 | 6/2005 | Simpson et al. | 370/338 |
| 2005/0188419 A1 | 8/2005 | Dadhia et al. | 726/1 |
| 2005/0203886 A1 | 9/2005 | Wong | 707/3 |
| 2005/0203921 A1 | 9/2005 | Newman et al. | 707/100 |
| 2005/0229255 A1 * | 10/2005 | Gula et al. | 726/23 |
| 2006/0010245 A1 | 1/2006 | Carnahan | 709/231 |
| 2006/0018466 A1 | 1/2006 | Adelstein et al. | 380/46 |
| 2006/0117091 A1 | 6/2006 | Justin | 709/217 |
| 2006/0184682 A1 * | 8/2006 | Suchowski et al. | 709/229 |
| 2006/0191008 A1 | 8/2006 | Fernando et al. | 726/23 |
| 2006/0282894 A1 | 12/2006 | Duffield et al. | 726/23 |
| 2007/0028304 A1 | 2/2007 | Brennan | 726/24 |
| 2007/0169190 A1 | 7/2007 | Kolton et al. | 726/22 |
| 2007/0256129 A1 | 11/2007 | Jung et al. | 726/24 |
| 2007/0271598 A1 | 11/2007 | Chen et al. | 726/4 |
| 2007/0271613 A1 | 11/2007 | Joyce | 726/23 |
| 2007/0277238 A1 | 11/2007 | Margalit et al. | 726/22 |
| 2008/0022400 A1 | 1/2008 | Cohen et al. | 726/22 |
| 2008/0047009 A1 | 2/2008 | Overcash et al. | 726/23 |
| 2008/0072285 A1 | 3/2008 | Sankaran et al. | 726/2 |
| 2008/0307524 A1 | 12/2008 | Singh et al. | 726/22 |
| 2009/0013141 A1 | 1/2009 | Kinoshita | 711/163 |
| 2009/0049016 A1 | 2/2009 | Sakamoto | |
| 2009/0138945 A1 | 5/2009 | Savchuk | 726/4 |
| 2009/0177782 A1 | 7/2009 | Blatherwick et al. | 709/228 |
| 2010/0030780 A1 | 2/2010 | Eshghi et al. | 707/6 |
| 2010/0043066 A1 | 2/2010 | Miliefsky | 726/9 |
| 2010/0114842 A1 | 5/2010 | Forman et al. | 707/692 |
| 2010/0281539 A1 | 11/2010 | Burns et al. | 726/23 |
| 2011/0099631 A1 | 4/2011 | Willebeek-Lemair et al. | 726/23 |
| 2011/0185055 A1 | 7/2011 | Nappier et al. | 709/224 |
| 2011/0185431 A1 | 7/2011 | Deraison | 726/25 |
| 2011/0231935 A1 | 9/2011 | Gula et al. | 726/25 |
| 2011/0277034 A1 | 11/2011 | Hanson | 726/25 |
| 2011/0314245 A1 | 12/2011 | Hanes et al. | 711/164 |
| 2013/0227714 A1 | 8/2013 | Gula et al. | 726/32 |
| 2013/0247148 A1 | 9/2013 | Nappier et al. | 726/3 |

OTHER PUBLICATIONS

Deraison, Renaud, et al., "Passive Vulnerability Scanning Introduction to NeVo", Revision 9, Tenable Network Security, Aug. 2003, pp. 1-13.

Deraison, Renaud, et al., "Unified Security Monitoring (USM); Real-Time Situational Awareness of Network Vulnerabilities, Events and Configurations", Revision 2, Tenable Network Security, Jan. 27, 2009, 12 pages.

Zhang, Yin, et al., "Detecting Backdoors", *Proceedings of the 9th USENIX Security Symposium*, Denver, Colorado, Aug. 2000, 11 pages.

"Basic Cryptanalysis", Department of the Army, Field Manual No. 34-40-2, Sep. 13, 1990, 363 pages.

Kim, Gene H., et al., "The Design and Implementation of Tripwire: A File System Integrity Checker", *Proceedings of the 2nd ACM Conference on Computer and Communications Security*, 1994, (Purdue Technical Report CSD-TR-93-071), 18 pages.

Oline, Adam, et al., "Exploring Three-Dimensional Visualization for Intrusion Detection", *Workshop on Visualization for Computer Security*, IEEE, Oct. 26, 2005, 9 pages.

"Present Your Data in a Column Chart", *Microsoft*, 2007, 6 pages.

Kim et al., "Real-Time Visualization of Network Attacks on High-Speed Links", *IEEE*, 2004, 10 pages.

Huang et al., "Research of Security Metric Architecture for Next Generation Network", *IEEE*, 2009, 6 pages.

\* cited by examiner

VIEW CUMULATIVE VULNERABILITIES

| | Query Tool: | Matching CIDR: | Matching Ports: | Vulnerabilities: | Recommendations: | Protocol: | Severity: |
|---|---|---|---|---|---|---|---|
| Clear | List of operating systems ▼ | | | | ☐ With ☐ Without | none ▼ | none ▼ |

| | False Pos. ☐ Only | Vulnerability Detection: ☐ No Passive ☐ No Active | Asset Filter: ☐ Exact Match | Asset Type: no type ▼ | Asset Place: no place ▼ | Asset Description: no description ▼ | View by: IP address ▼ | Matching Text: |

Actively Detected — 710

| Count | Operating System |
|---|---|

Passively Detected — 720

| Count | Operating System |
|---|---|
| 2888 | Microsoft Windows 2000 Server Service Pack4<br>Microsoft Windows XP Home Edition Service Pack 1<br>Microsoft Windows XP Home Edition<br>Microsoft Windows 2000 Server |
| 1761 | Microsoft Windows XP Home Edition Service Pack 1<br>Microsoft Windows XP Home Edition<br>Microsoft Windows 2000 Server |
| 1380 | Microsoft Windows XP Professional Service Pack 1<br>Microsoft Windows 2000 Server Service Pack 3<br>Microsoft Windows XP Home Edition<br>Microsoft Windows 2000 Server |
| 143 | FreeBSD 4.7<br>FreeBSD 4.8<br>FreeBSD 4.9<br>FreeBSD 5.0<br>FreeBSD 5.1<br>MacOS X |
| 126 | UNKNOWN |

FIG. 7

SYSTEM AND METHOD FOR ENABLING REMOTE REGISTRY SERVICE SECURITY AUDITS

CROSS-REFERENCE TO RELATED APPLICATIONS

This application is a continuation of U.S. patent application Ser. No. 12/695,659, entitled "System and Method for Enabling. Remote Registry Service Security Audits," filed Jan. 28, 2010 (and which issued as U.S. Pat. No. 8,302,198 on Oct. 30, 2012), which is related to U.S. patent application Ser. No. 10/863,238, entitled "System and Method for Managing Network Vulnerability Analysis Systems," filed Jun. 9, 2004 (and which issued as U.S. Pat. No. 7,926,113 on Apr. 12, 2011); U.S. patent application Ser. No. 11/016,761, entitled "System and Method for Scanning a Network," filed Dec. 21, 2004 (and which issued as U.S. Pat. No. 7,761,918 on Jul. 20, 2010); and U.S. patent application Ser. No. 11/313,710, entitled "System and Method for Managing Events," filed Dec. 22, 2005, now abandoned, the contents of which are hereby incorporated by reference in their entirety.

FIELD OF THE INVENTION

The invention relates to a system and method for enabling remote registry service security audits, and in particular, to analyzing characteristics describing various devices in a network to determine whether a remote registry service has been enabled on the devices, performing credentialed policy scans to enable the remote registry service for certain devices that have disabled the remote registry service, auditing the devices in response to enabling the remote registry service, and then disabling the remote registry service on the devices.

BACKGROUND OF THE INVENTION

In many network environments, illegal or unauthorized users may exploit vulnerabilities in the network to gain access, deny access, or otherwise attack systems in the network. As such, to detect and remediate such network vulnerabilities, existing network security systems typically conduct vulnerability analysis in the network through manual inspection or network scans. For example, as discussed in co-pending U.S. patent application Ser. No. 11/016,761, the contents of which are incorporated by reference above, passive and active vulnerability scans may be conducted separately or in combination with one another to identify vulnerabilities in a network. In particular, active vulnerability scanners typically send packets or other messages to various devices in the network that the active vulnerability scanners may be auditing. In many instances, to effectively perform a vulnerability scan, the active vulnerability scanners typically need access to certain information in the audited devices, including a registry that contains settings and configurations associated with operating systems, kernels, device drivers, or other applications that may be running on the audited devices.

As such, because vulnerability scans typically involve an active vulnerability scanner remotely accessing a device that the active vulnerability scanner may be auditing, the active vulnerability scanner must access the registries for such devices remotely. However, improper or malicious manipulation of the information contained in the registry for any particular device in a network can cause many different problems or other vulnerabilities in the device and the network. Thus, many networks disable services that enable remote access to device registries to protect the devices and the network from undesirable, unauthorized, or malicious activity. Furthermore, many operating systems (e.g., Windows Vista™) have default configurations that automatically disable the services that enable remote access to device registries. For example, U.S. Patent Application Pub. No. 2004/0003266, entitled "Non-Invasive Automatic Offsite Patch Fingerprinting and Updating System and Method," the contents of which are hereby incorporated by reference in their entirety, notes that services that provide registry information to remote computers can present security risks because such services can expose information that can be referenced to facilitate network infiltration or other network attacks.

Accordingly, many existing network systems tend to avoid using services that enable remote access to a device registry due to the security risks that such services can introduce to a network. However, the device registry often contains vital information that may be necessary to perform a complete network audit. For example, as noted above, the device registry can contain information that describes an operating system version, system file locations, or other information that be valuable to identifying vulnerabilities needed to properly and completely audit the network. Therefore, because existing network security systems tend to disable or restrict access to services that can be used to remotely access device registries, existing network security systems often cannot obtain important information from the device registries that may be needed to suitably audit a network. Furthermore, when existing network security systems enable the services provide remote access to the device registries, attackers or other malicious users may exploit the security risks that such services introduce.

Therefore, a need exists for a network security system that can remotely scan device registries during a network audit without exposing the device registries to malicious activity.

SUMMARY OF THE INVENTION

Accordingly to one aspect of the invention, the system and method for enabling remote registry service security audits described herein may include scanning a network to construct a model or topology of the network. In particular, the model or topology of the network may include characteristics describing various devices in the network, which may be analyzed to determine whether a remote registry service has been enabled on the devices. For example, the security audits may include performing one or more credentialed policy scans to enable the remote registry service for certain devices that have disabled the remote registry service, auditing the devices in response to enabling the remote registry service, and then disabling the remote registry service on the devices. Thus, the system and method described herein may enable remotely scanning information contained in device registries during a security audit without exposing the device registries to malicious activity.

According to one aspect of the invention, the system and method described herein may include a vulnerability management system that maintains a model of a network, wherein the model of the network may include a plurality of devices discovered in the network that have a remote registry service. Further, an active vulnerability scanner may actively scan the network to detect one or more vulnerabilities in the network. For example, the active vulnerability scanner may identify one or more of the devices discovered in the network that have disabled the remote registry service and then communicate activation messages to the identified devices to enable the remote registry service on the identified devices. The active vulnerability scanner may then interact with the remote registry service enabled on the identified devices to obtain registry information from the identified devices and then communicate deactivation messages to the identified devices in response to obtaining the registry information from the identified devices. As such, the deactivation messages may disable the remote registry service on the identified devices, which may prevent subsequent malicious or unauthorized attempts to manipulate the remote registry service.

Other objects and advantages of the invention will be apparent to those skilled in the art based on the following drawings and detailed description.

BRIEF DESCRIPTION OF THE DRAWINGS

FIGS. 6-7 illustrate exemplary screenshots showing information that the system for enabling remote registry service audits can obtain using a passive vulnerability scanner and an active vulnerability scanner, according to one aspect of the invention.

DETAILED DESCRIPTION

The system and method for enabling remote registry service security audits described herein may remotely scan various devices in a network to obtain information contained in registries associated with the devices. In particular, the system and method described herein may employ one or more active vulnerability scanners and one or more passive vulnerability scanners during the remote registry service security audits to identify vulnerabilities or otherwise manage the network. In one implementation, the active vulnerability scanners and the passive vulnerability scanners may collect information describing the devices in the network and services actively running in the network. For example, in one implementation, the information collected from the network may be analyzed to identify one or more devices having a remote registry service, wherein the active vulnerability scanner may temporarily enable the remote registry service on the identified devices to obtain information from the registries associated with such devices and then disable the remote registry service to prevent unauthorized or malicious activity from remote users. Furthermore, the information obtained from the active and passive vulnerability scanners may be used to build a model or topology of the network, detect vulnerabilities in the network, and otherwise manage the network. For example, the passive and active vulnerability scanners may continually or periodically inspect the network to identify new ports, new hosts, or other changes in the network, identify vulnerabilities in the network, and detect events that may target the identified vulnerabilities.

Figure 1:
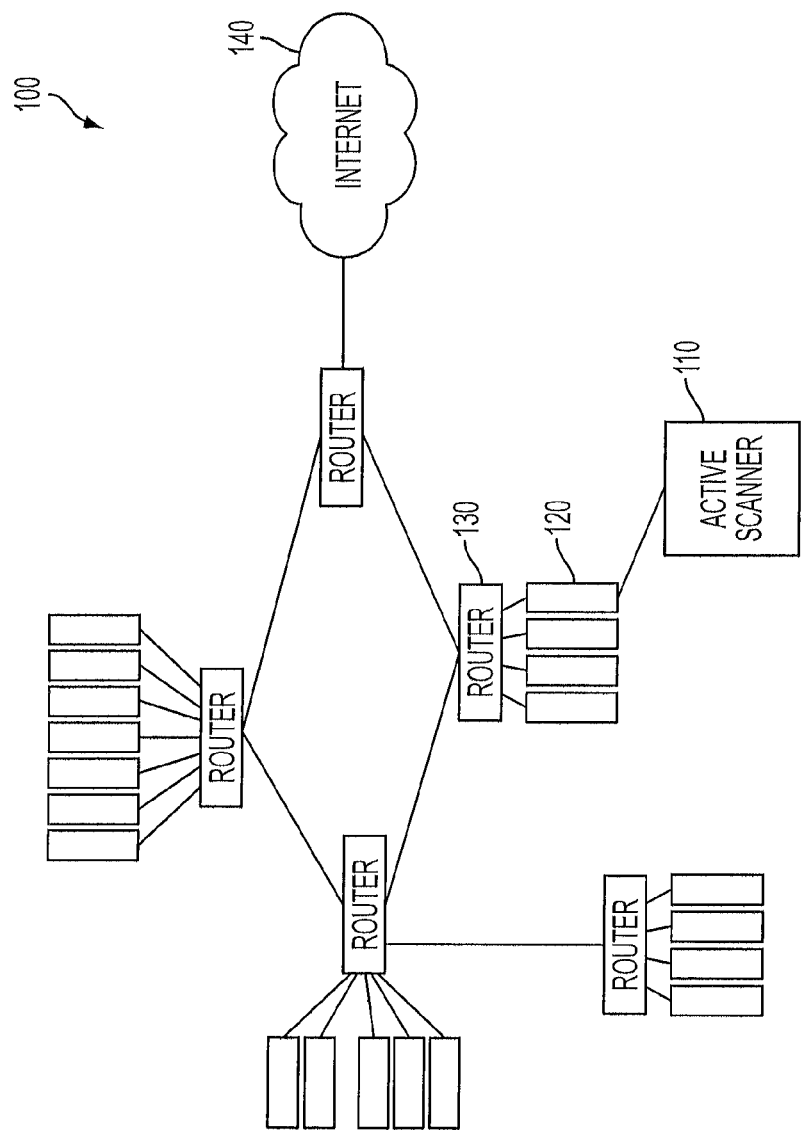
FIG. 1 illustrates a schematic diagram of an exemplary prior art system that does not enable remote registry service security audits.

In contrast, FIG. 1 illustrates a schematic diagram of an exemplary prior art system 100 that does not enable remote registry service security audits. More particularly, the prior art system 100 shown in FIG. 1 may generally include a network having multiple routers 130, various network hosts or other devices 120, an active vulnerability scanner 110, and an interface to one or more other networks 140 (e.g., the Internet). In the prior art system 100, the active vulnerability scanner 110 may send packets or other messages to the hosts or devices 120 in the network through the routers 130 to identify one or more of the hosts or devices 120 actively running in the network and one or more of the hosts or devices 120 that may be inactive. However, in scenarios where one or more of the hosts or devices 120 have a remote registry service that has been disabled, the prior art system 100 typically prevents the active vulnerability scanner from remotely obtaining information from registries that may describe important settings, configurations, or other information associated with the hosts or devices 120. Accordingly, although the active vulnerability scanner 110 in the prior art system 100 can obtain certain information describing the network, the prior art system 100 does not enable remote registry service security audits that could otherwise yield important information relevant to identifying vulnerabilities in the network, building a complete model or topology of the network, or otherwise managing the network.

Figure 2:
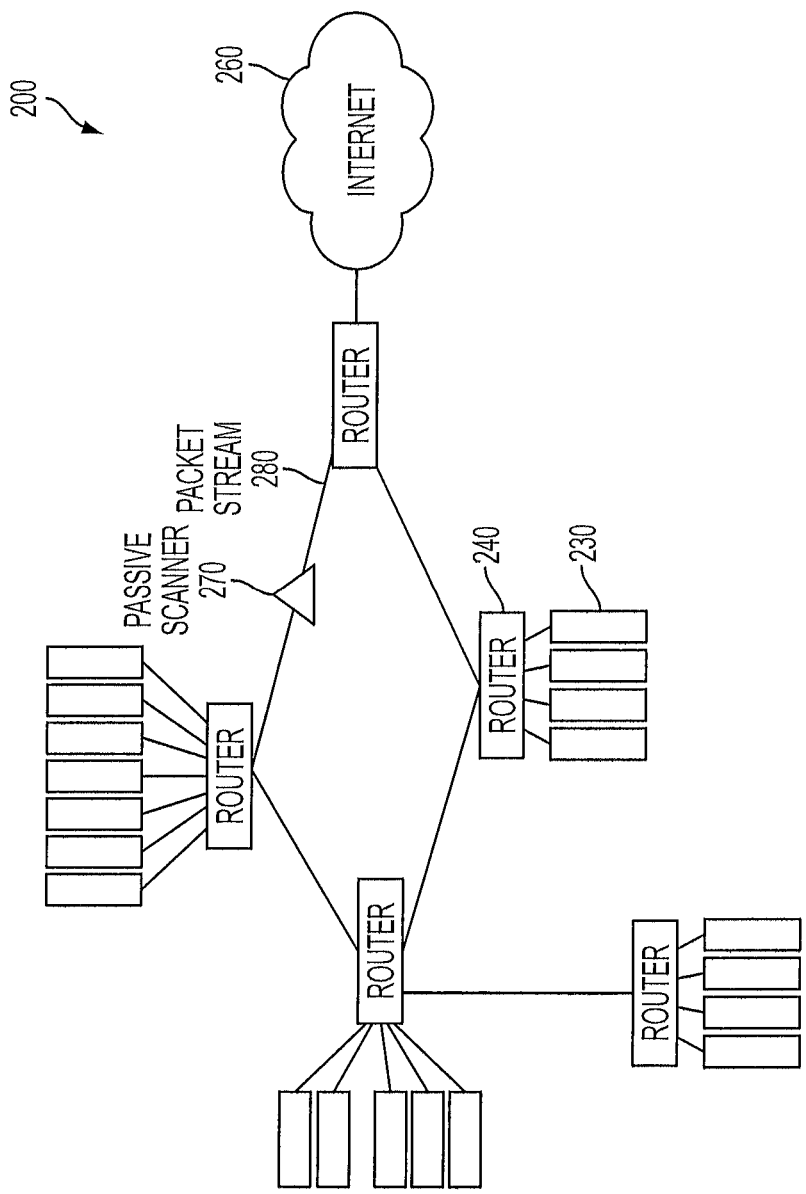
FIG. 2 illustrates a schematic diagram of an exemplary system for enabling remote registry service security audits, according to one aspect of the invention.

According to one aspect of the invention, FIG. 2 illustrates a schematic diagram of an exemplary system 200 for enabling remote registry service security audits. In particular, the system 200 shown in FIG. 2 may generally include one or more passive vulnerability scanners 270 that can observe traffic in a packet stream 280 travelling in a network to identify vulnerabilities in the network and detect activity that may target the identified vulnerabilities, and may further include one or more active vulnerability scanners that can communicate packets or other messages within the network to detect new or changed information describing various routers 240, hosts 230, servers 230, or other devices 230 in the network. For example, in one implementation, the active vulnerability scanners may include active vulnerability scanners 410 and 420 (e.g., illustrated in FIG. 4), which may temporarily enable a remote registry service on certain hosts, servers, or other devices 230 in the network and then scan registries associated with such devices 230 during a security audit. The active vulnerability scanner may then disable the remote registry service to prevent unauthorized or malicious activity from remote users (e.g., originating from a remote network 260, such as the Internet). The information obtained from remotely scanning the registries associated with the devices 230 may then be analyzed to identify potential vulnerabilities in the network, and the passive vulnerability scanner 270 may then observe packet streams 280 traversing the network to detect activity that potentially targets the vulnerabilities identified in the remote registry scan.

In one implementation, the passive vulnerability scanner 270 may observe as many sessions in the network as possible to provide optimal visibility into the network and the activity that occurs in the network. For example, in one implementation, the passive vulnerability scanner 270 may be deployed at a network hub, a spanned switch port, a network tap, a network choke point, a dial up node, a server farm, behind a firewall, or any other suitable location that enables the passive vulnerability scanner 270 to observe incoming and outgoing traffic in the network. Alternatively (or additionally), the passive vulnerability scanner 270 may be deployed directly in or adjacent to an intrusion detection system (IDS), as shown and discussed below in connection with FIG. 5. Furthermore, in one implementation, the IDS may include an open source network intrusion prevention and detection system (e.g., Snort), a packet analyzer, or any other suitable system that can detect and prevent intrusions in the network; and the passive vulnerability scanner 270 may be deployed on a server running an open source operating system (e.g., a Red Hat Linux operating system, a FreeBSD operating system, etc.), or any other suitable operating system.

In one implementation, as noted above, the active vulnerability scanner may generally communicate various packets or other messages within the network to illicit responses from hosts, servers, or other devices 230 in the network. In contrast, the passive vulnerability scanner 270 may generally observe (or "sniff") various packets in the packet stream 280 traversing the network to passively scan the network. In particular, the passive vulnerability scanner 270 may reconstruct one or more sessions in the network from information contained in the packets sniffed in the packet stream 280, wherein the reconstructed network sessions may then be used to build a model or topology describing the network (e.g., any routers 240, hosts, servers, or other devices 230 actively running in the network, any services actively running on the routers 240, hosts, servers, or other devices 230, etc.). In one implementation, the passive vulnerability Scanner 270 may further apply various signatures to the information observed in the packet stream 280 to identify vulnerabilities in the network and determine whether any packets in the packet stream 280 potentially target such vulnerabilities. In one implementation, the passive vulnerability scanner 270 may observe the packet stream 280 continuously, at periodic intervals, on a pre-configured schedule, or in response to determining that certain criteria or conditions have been satisfied. The passive vulnerability scanner 270 may then automatically reconstruct the network sessions, build or update the network model, identify the network vulnerabilities, and detect the traffic potentially targeting the network vulnerabilities in response to detecting any new or changed information in the network.

Figure 3:
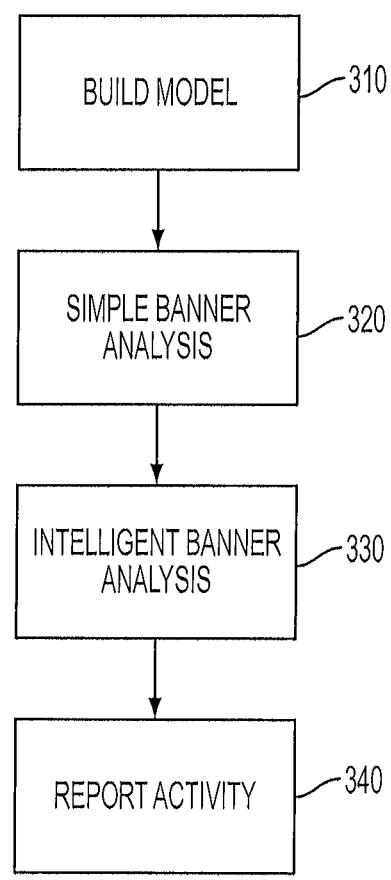
FIG. 3 illustrates a flowchart of an exemplary method for scanning a network using a passive vulnerability scanner in the system for enabling remote registry service security audits, according to one aspect of the invention.

According to one aspect of the invention, FIG. 3 illustrates a flowchart of an exemplary method 300 for scanning a network using a passive vulnerability scanner. In particular, as noted above, the passive vulnerability scanner may perform the method 300 continuously, at periodic intervals, on a pre-configured schedule, or in response to determining that certain criteria or conditions have been satisfied. In one implementation, the method 300 shown in FIG. 3 may include an operation 310, wherein the passive vulnerability scanner may sniff various packets in a packet stream travelling across the network and build a model or topology of the network from information contained in the sniffed packets. In one implementation, the passive vulnerability scanner may build or update the network model in operation 310 continuously (i.e., anytime new or changed information has been discovered), at periodic intervals, at predetermined times, or in response to determining that certain criteria or conditions have been satisfied.

For example, in one implementation, the model or topology may be automatically updated to include any active devices that send or receive the packets in the packet stream (e.g., routers, hosts, servers, etc.), and further to include any active services running on the active devices that interact with the packets in the packet stream (i.e., operation 310 generally includes the passive vulnerability scanner observing traffic in the network and building the model to represent the devices active in the network and the services actively running on the active devices). For example, in response to observing a Transmission Control Protocol (TCP) SYN-ACK packet originating from port twenty-five on a particular device, the model may be updated in operation 310 in response to determining that the SYN-ACK packet represents new information to the model. Thus, from analyzing SYN and SYN-ACK packets in the packet stream, the passive vulnerability scanner may determine a status, identity, or other information describing active devices in the network.

In one implementation, the active devices that the passive vulnerability scanner discovers in the network may generally represent server devices and client devices. In particular, the active devices that provide services to other devices may represent the server devices (e.g., web servers, File Transfer Protocol servers, etc.), and the active devices that connect to the services provided on the server devices may represent the client devices. For example, in a context where a user machine connects to a particular web site (e.g., Google), the web site may generally include one or more server devices that provide services that can respond to requests received from the user machine, while the user machine, which typically does not provide any services within a local or remote network, may represent a client device. Thus, the server devices may generally provide the services on numbered ports, wherein each service available on the server devices may have a different port number, while the client devices may connect to particular services on the server devices using certain network addresses and port numbers. For example, a server device may provide a File Transfer Protocol (FTP) service on port twenty-one, while a client device may connect an Internet Protocol (IP) address for the server device on port twenty-one to access the FTP service.

In one implementation, the SYN and SYN-ACK packets described above may further provide information that can be used to identify operating systems running on the devices active in the network. For example, different operating systems (e.g., Linux, Windows XP, Solaris, etc.) tend to build SYN packets that can be uniquely distinguished from SYN packets originating from other operating systems, whereby the passive vulnerability scanner may analyze a structure for SYN packets originating from a certain device to determine an operating system running on the device. In one implementation, the passive vulnerability scanner may further analyze applications running on the devices to uniquely identify the operating systems running on the devices. For example, certain web browsers (e.g., Internet Explorer), email applications (e.g., Eudora), and other applications typically include information describing an underlying operating system (e.g., Windows XP) directly into various protocols, and the passive vulnerability scanner may detect such information from the traffic observed in the packet stream to identify the underlying operating system associated with the traffic. Alternatively (or additionally), an active vulnerability scanner may directly interrogate the device to identify the operating system running on the device.

In the context of remote registry service security audits, knowing the operating systems running on the devices in the network may be important to obtaining information from registries associated with the devices. For example, certain operating systems (e.g., Windows Vista™) automatically disable a service that provides remote access to the registry, whereby knowing that a certain device runs the Windows Vista™ may be relevant to determining the manner for remotely accessing the registry on the device. Thus, in response to recognizing the active devices in the network and services and operating systems running on the active devices, an operation 320 may include the passive vulnerability scanner searching and/or scanning the network model to identify vulnerabilities in the network. In particular, operation 320 may include the passive vulnerability scanner performing simple banner analysis to identify any known vulnerability signatures in the traffic previously observed to build the network model. For example, in one implementation, the passive vulnerability scanner may reference a table stored in memory that correlates various known vulnerabilities with particular service versions, or the passive vulnerability scanner may forward information describing the service versions to a correlation engine or another suitable system that can recognize known vulnerabilities for the service versions from the forwarded information.

For example, in one implementation, to identify the vulnerability signatures, the passive vulnerability scanner may reconstruct various network sessions from the previously observed traffic in the network (e.g., sessions that include conversations or other messages exchanged between various server devices and client devices). Thus, in response to reconstructing the network sessions, operation 320 may include the passive vulnerability scanner analyzing the traffic associated with the reconstructed network sessions to identify any evidence relevant to particular vulnerabilities in the server devices and the client devices that communicate in the network sessions. In particular, the passive vulnerability scanner may recognize the known vulnerability signatures using simple banner analysis to identify services and versions of services that have known vulnerabilities. For example, packets communicated over certain protocols (e.g., Hypertext Transfer Protocol (HTTP), Simple Mail Transport Protocol (SMTP), FTP, etc.) typically have unique strings with text that can be used to identify a service version associated with the packets, whereby the passive vulnerability scanner may perform the simple banner analysis to identify the communication protocols and service versions involved in the network sessions. Consequently, in response to determining the communication protocols and the service versions involved in the network sessions, the passive vulnerability scanner may further identify any known vulnerabilities associated therewith.

However, in one implementation, certain communication protocols may have more complexity, whereby the simple banner analysis performed in operation 320 may not suitably identify the communication protocols or the service versions involved in the network sessions. Rather, more complex communication protocols (e.g., Domain Name System protocols, Simple Network Management Protocol, etc.) may require additional processing and analysis to suitably identify the versions for the services used to communicate the packets or other messages involved in the network sessions. As such, in one implementation, an operation 330 may include the passive vulnerability scanner performing intelligent banner analysis to handle any network sessions that involve more complex communication protocols. In particular, the passive vulnerability scanner may employ a signature language that defines various techniques for creating regular expression macros that can represent information communicated over more complex protocols. For example, the regular expression macros may include one or more text lines to represent patterns that the information communicated over the complex protocols typically include (e.g., knowledge obtained from monitoring communications over the complex protocols may be used to effectively write signatures for such protocols). As such, the passive vulnerability scanner may match signatures from packets communicated over complex protocols to the regular expression macros to identify service versions associated with such packets and correlate the signatures and service versions with known vulnerabilities.

Thus, the passive vulnerability scanner may generally recognize vulnerabilities in the network through a combination simple and intelligent banner analysis that can be used to identify signatures in the network traffic that match certain predetermined patterns. In particular, the passive vulnerability scanner may initially identify the signatures using simple banner analysis in operation 320, and then proceed to intelligent banner analysis in operation 330 to handle increasingly complex signatures. For example, in one implementation, operation 320 may include the passive vulnerability scanner identifying a web service running on a particular port at a particular network address (e.g., "Web service running at 10.20.30.40 on port 80"). In addition, operation 330 may then include the passive vulnerability scanner identifying a particular version of the web service (e.g., "Apache web server running at 10.20.30.40 on port 80") and a particular vulnerability for the version of the web service, whereby the vulnerability may then be reported in an operation 340 (e.g., the report may indicate that "The Apache web server running at 10.20.30.40 on port 80 has Apache version 2.1.3, which includes the following vulnerabilities . . . ").

In one implementation, as noted above, the passive vulnerability scanner may report the activity observed in the network and any vulnerabilities identified from the activity in operation 340. In one implementation, the passive vulnerability scanner may be configured to generate or communicate the report in response to observing a number of network sessions that meets or exceeds a predetermined threshold. Furthermore, in one implementation, the passive vulnerability scanner may be configured to require a minimum number of network sessions involving particular ports prior to identifying the port as active in the network. In one implementation, the minimum number of network sessions that must be observed prior to reporting a new active port may provide a level of sensitivity that can prevent the passive vulnerability scanner from reporting false positives and/or false negatives (e.g., a higher minimum number of sessions may cause the passive vulnerability scanner to only report services that have a large numbers of sessions, while a lower minimum number may cause the passive vulnerability scanner to report every observed network session).

For example, FTP applications, peer-to-peer file sharing application, instant message applications, and other similar applications often temporarily open ports on connections that may not be well known. Thus, the passive vulnerability scanner may observe the connection on the unknown port that has been temporarily opened and identify a new server on the port. Thus, requiring the minimum number of sessions for certain, ports may enable the passive vulnerability scanner to avoid detecting temporary servers or services. In particular, because FTP, peer-to-peer, and instant message applications seldom establish communication channels on unknown ports in comparison to web servers that can establish many connections per second, the minimum number of network sessions may eliminate false positives that report temporary servers or services. Nonetheless, the passive vulnerability scanner may be configured to monitor and report any activity in the network, including temporary activity, in which case the minimum number of network sessions may be one or another low number.

Figure 4:
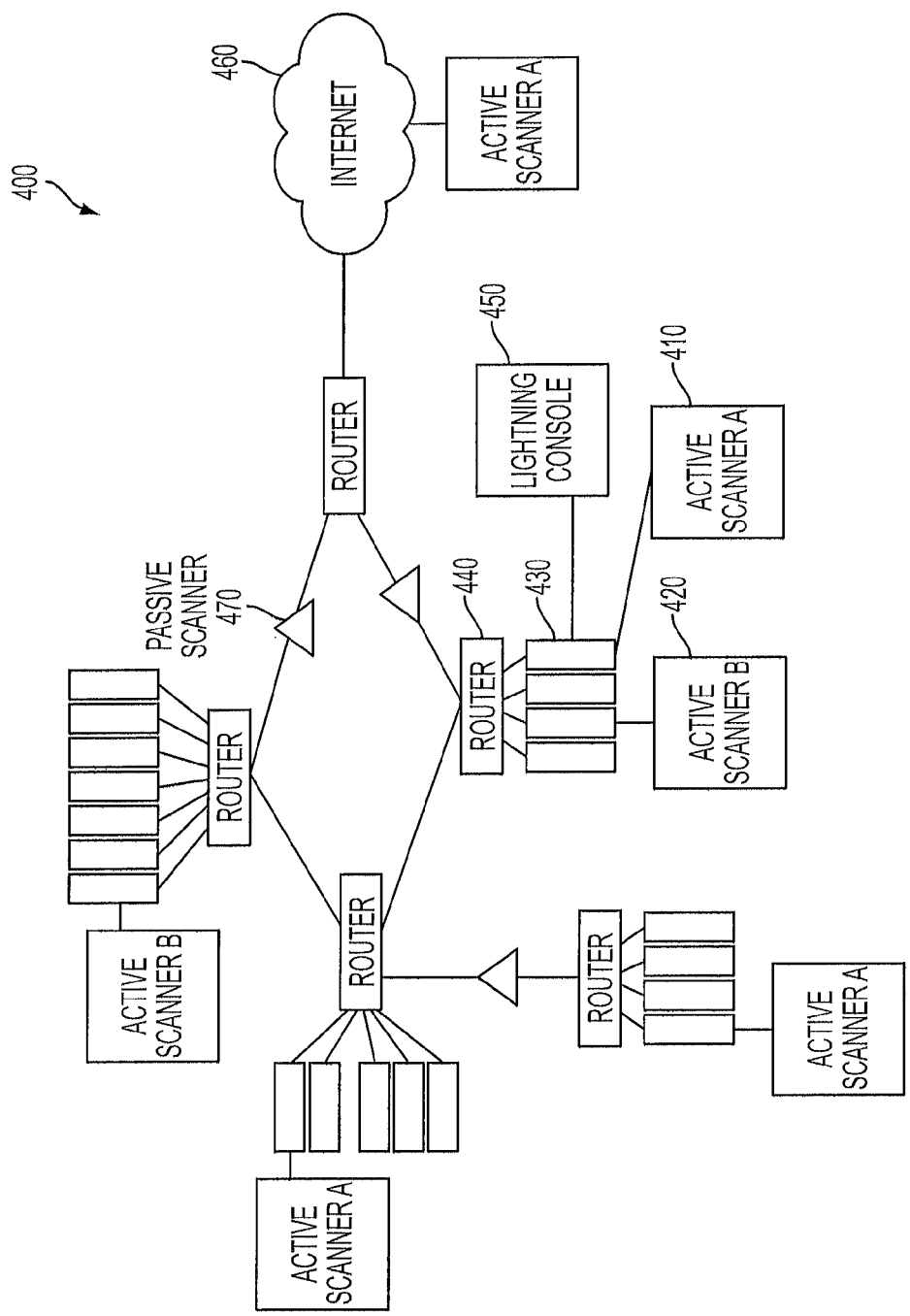
FIG. 4 illustrates another schematic diagram of the system for enabling remote registry service security audits, according to one aspect of the invention.

According to one aspect of the invention, FIG. 4 illustrates another schematic diagram of the system 400 for enabling remote registry service security audits. In particular, the system 400 shown in FIG. 4 may include a passive vulnerability scanner 470 that can passively observe traffic in a network to build a model or topology of the network, identify vulnerabilities in the network, and detect activity that may potentially target the vulnerabilities. In addition, the system 400 may further include one or more active vulnerability scanners (e.g., active vulnerability scanner 410, active vulnerability scanner 420, etc.), which may interrogate devices in the network to further build the model or topology of the network and identify further vulnerabilities in the network. Thus, the information obtained from the passive vulnerability scanner 470 and the active vulnerability scanners 410 and 420 may be combined to comprehensively model the network and the vulnerabilities in the network, whereby the passive vulnerability scanner may then passively observe traffic in the network to detect activity potentially targeting the vulnerabilities.

In one implementation, the active vulnerability scanners 410 and 420 and the passive vulnerability scanner 470 may be distributed across the network to reduce stress on the network. For example, in one implementation, the active vulnerability scanners 410 and 420 may scan limited portions of the network in parallel, whereby an amount of time to perform the active vulnerability scans may be reduced (i.e., because any particular active vulnerability scanner 410 or 420 can be distributed closer in distance to scanning targets 430, and because any particular active vulnerability scanner 410 or 420 only scans a certain portion of the network rather than the entire network). Furthermore, in one implementation, the passive vulnerability scanner 470 may supplement the information that the active vulnerability scanners 410 and 420 obtain from actively scanning the network (e.g., to obtain information that the active vulnerability scanners 410 and 420 may be unable to access).

For example, the passive vulnerability scanner 470 may depend on traffic that can be observed in the network to detect network devices or identify vulnerabilities in the network. As such, because the passive vulnerability scanner 470 can only detect devices or vulnerabilities from communications observed in the network, the active vulnerability scanners 410 and 420 may interrogate any device in the network to obtain information from inactive or non-communicative devices, whereby the active vulnerability scanners 410 and 420 and the passive vulnerability scanner 470 may provide a more comprehensive vulnerability analysis. Similarly, the active vulnerability scanners 410 and 420 may require substantial resources and/or time to complete active scans in the network, whereby active scanning results may become stale between the active scans. Thus, the passive vulnerability scanner 470 may continuously observe traffic on the network between the active scans to supplement the information obtained in the active scans without further stressing the network.

In one implementation, the system 400 may therefore further include a log correlation engine 450 (referred to as "Lightning Console" in FIG. 4), wherein the log correlation engine 450 may employ various techniques to provide a comprehensive vulnerability analysis system, as described in further detail in co-pending U.S. patent application Ser. No. 10/863,238, the contents of which are incorporated by reference above. In particular, the information obtained from the passive vulnerability scanner 470 and the active vulnerability scanners 410 and 420 may be forwarded to the log correlation engine 450, which may then aggregate the information to obtain active scanning information and passive scanning information that collectively encompasses the entire network. As such, the log correlation engine 450 may generally organize, distribute, manage, and report information relating to activity detected and remediated during network security audits to various entities across various organizations. For example, the log correlation engine 450 may aggregate information from the passive vulnerability scanner 470, the active vulnerability scanners 410 and 420, or other information sources, wherein the log correlation engine 450 may then analyze the information to identify vulnerabilities in the network, correlate events and other activity in the network with the vulnerabilities, and otherwise manage the network. Further, the information that the log correlation engine 450 analyzes may include the information that the active vulnerability scanners 410 and 420 obtains from the registries on the devices in the network to identify vulnerabilities and otherwise manage the network.

Furthermore, as noted above, the information obtained from the passive vulnerability scanner 470 and the active vulnerability scanners 410 and 420 may include information for identifying services that can be used to access registries associated with the network devices (e.g., operating system versions), which may enable certain types of security audits and vulnerability analysis. For example, in one implementation, the active vulnerability scanners 410 and 420 may include a publicly available active vulnerability scanner (e.g., Nessus, available from Tenable Network Security), an active vulnerability scanner with a complimentary license (e.g., NeWT, also available from Tenable Network Security), or a professionally licensed active vulnerability scanner (e.g., NeWT Pro, also available from Tenable Network Security). Further, the active vulnerability scanners 410 and 420 may include one or more plug-ins that can enable and disable the remote registry service on certain network devices, and may further include an interface to incorporate customized plug-ins that enable similar functionality. For example, the active vulnerability scanners 410 and 420 may employ a Nessus Attack Scripting Language (NASL), which may enable the active vulnerability scanners 410 and 420 to interact services that provide remote access to registries on devices running Windows XP, Windows 2002 Unix, MacOS X, Free BSD, Linux, Solaris, or other suitable operating systems.

Thus, in one implementation, to access the registry on any particular device in the network, the active vulnerability scanners 410 and 420 may interact with a remote registry service associated with an operating system running on the device. In particular, the remote registry service may generally permit the active vulnerability scanners 410 and 420 to remotely access the registry on the device in response to determining that the active vulnerability scanners 410 and 420 have proper credentials, which may conveniently enable security audits based on information that may be contained in the registry. However, in many cases the remote registry service may be disabled (e.g., certain operating systems may automatically disable the remote registry service, an administrator may disable the remote registry service to reduce security risks, etc.), whereby the active vulnerability scanners 410 and 420 may be unable to remotely read keys, values, and other information from the registries, even with fully authorized credentials.

Accordingly, in one implementation, the active vulnerability scanners 410 and 420 may be configured to temporarily enable the remote registry service on any suitable device that has disabled the remote registry service, which may enable remote security audits on the information contained in the registries. For example, the remote registry service audits may include checking file levels, locating system files, auditing patches, determining remote operating system versions, or otherwise analyzing information contained in the registry that may be relevant to performing a complete audit that identifies and remediates vulnerabilities in the network. Thus, the active vulnerability scanners 410 and 420 may temporarily enable or activate the remote registry service on certain devices in the network prior to and/or during a credentialed scan or security audit, and may further temporarily enable administrator accounts on any devices that automatically disable administrator access. For example, devices in the network may generally be configured to permit entities having administrator or other suitable credentials to temporarily enable or activate the remote registry service, whereby temporarily enabling administrator accounts may be required to temporarily enable the remote registry service. Thus, in response to performing any steps needed to temporarily enable or activate the remote registry service, the active vulnerability scanners 410 and 420 may obtain any information that may be relevant to a security audit or credentialed scan from the registries and then disable the remote registry service to prevent unauthorized or malicious users from remotely gaining access to the registries.

Figure 5:
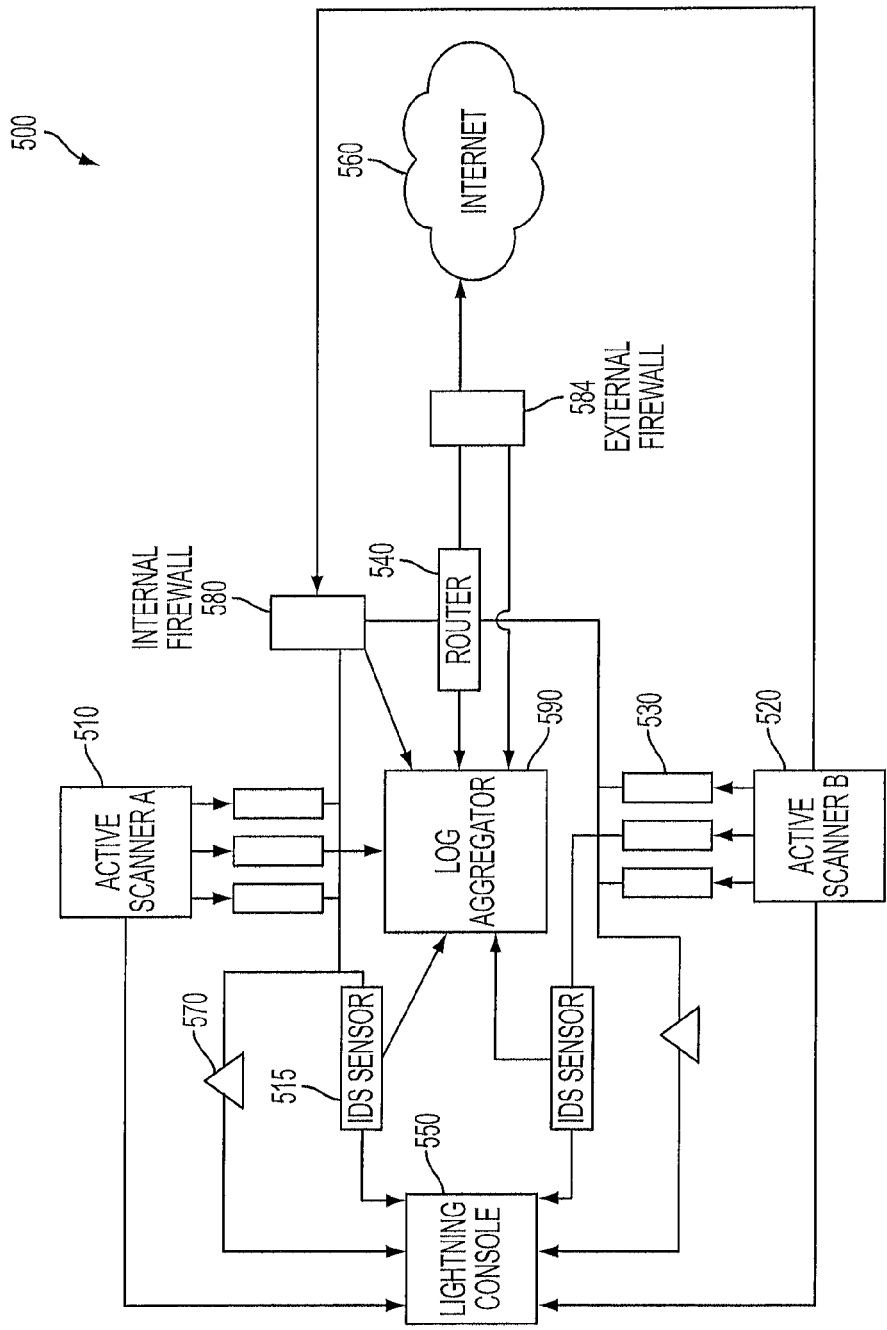
FIG. 5 illustrates another schematic diagram of the system for enabling remote registry service security audits, according to one aspect of the invention.

According to one aspect of the invention, FIG. 5 illustrates another schematic diagram of the system 500 for enabling remote registry service security audits. In particular, the system 500 shown in FIG. 5 may provide distributed network security, wherein a passive vulnerability scanner 570 and a plurality of active vulnerability scanners 510 and 520 may be integrated with a log correlation engine 550 (referred to as "Lightning Console" 550 in FIG. 5) and a log aggregator 590 to manage security and vulnerability information across a network. In one implementation, the passive vulnerability scanner 570 may generate one or more alerts in response to detecting new or changed information in the network from traffic observed in the network between active scans that the active vulnerability scanners 510 and 520 perform in the network. For example, the passive vulnerability scanner 570 may generate an alert in response to discovering a new vulnerability in the network from traffic observed in the network traffic and then forward the alert to the log correlation engine 550. In particular, the passive vulnerability scanner 570 may maintain a model describing active devices, services, and vulnerabilities in the network from traffic that actually travels across the network, whereby the passive vulnerability scanner 570 may continuously record information describing devices, services, and vulnerabilities associated with such traffic. As such, the passive vulnerability scanner 570 may detect the new or changed information in the network from comparing traffic describing devices, services, and vulnerabilities currently active in the network to the model that describes devices, services, and vulnerabilities active in the network at a previous time.

For example, in response to launching the passive vulnerability scanner 570, the passive vulnerability scanner 570 may observe traffic that describes a newly discovered router 540, internal firewall 580, external firewall 584, IDS sensor 515, remote hosts in a remote network 560 (e.g., the Internet), or other devices that communicate with the network. Further, the passive vulnerability scanner 570 may identify network addresses for the newly discovered devices, wherein the passive vulnerability scanner 570 may forward alerts describing the newly discovered devices and the network addresses associated therewith to the log correlation engine 550. Similarly, in response to the active vulnerability scanners 510 and 520 detecting new or changed information, the active vulnerability scanners 510 and 520 may generate a suitable alert and forward the same to the log correlation engine 550. In one implementation, the log correlation engine 550, which may generally manage the network model from the information obtained from the passive vulnerability scanner 570 and the active vulnerability scanners 510 and 520, may then compare the alerts forwarded from the passive vulnerability scanner 570 to a master database that describes the devices, services, and vulnerabilities in the network model. As such, the log correlation engine 550 may analyze the alerts forwarded from the passive vulnerability scanner 570 and suitably update the master database in response to determining that the alerts indeed describe new or changed information. However, in response to the log correlation engine 550 recognizing the network address and/or the newly discovered device, the log correlation engine 550 may determine that the alert represents a false positive rather than a new host, in which case the log correlation engine 550 may discard the alert without updating the master database.

In one implementation, as noted above, the active vulnerability scanners 410 and 420 and the passive vulnerability scanner 470 may be distributed across the network to reduce stress on the network. For example, in one implementation, the active vulnerability scanners 510 and 520 may be deployed inside the internal firewall 584 to actively scan devices in the network located therein (e.g., active vulnerability scanner 510), between the internal firewall 580 and the external firewall 584 to actively scan devices in the network located therein (e.g., active vulnerability scanner 520), outside the external firewall 584 to actively scan devices in the network located therein and/or in the remote network 560 (e.g., between an interface from the external firewall 584 to the remote network 560), or any suitable combination thereof. Similarly, the passive vulnerability scanner 570 may be deployed inside the internal firewall 584 to observe traffic travelling within the network (e.g., passive vulnerability scanner 570), between the internal firewall 580 and the external firewall 584 to observe incoming and outgoing traffic in the network (e.g., between the router 540 and the external firewall 584), outside the external firewall 584 to observe traffic originating from or travelling to the remote network 560 (e.g., between an interface from the external firewall 584 to the remote network 560), or any suitable combination thereof.

As such, in one implementation, deploying the passive vulnerability scanner 570 and the active vulnerability scanners 510 and 520 at different locations in the network may provide the log correlation engine 550 with passive and active scanning information that can be used to comprehensively model the devices, services, and vulnerabilities in the network. In particular, in response to the passive vulnerability scanner 570 and the active vulnerability scanners 510 and 520 actively or passively scanning the network, one or more alerts may be forwarded to the log correlation engine 550 in response to the passive vulnerability scanner 570 and the active vulnerability scanners 510 and 520 may detecting any new or changed information within an area of the network that the passive vulnerability scanner 570 and the active vulnerability scanners 510 and 520 may be responsible for scanning. Thus, the log correlation engine 550 may aggregate the information forwarded from the passive vulnerability scanner 570 and the active vulnerability scanners 510 and 520 with any further information that the log aggregator 590 receives from devices in the network (e.g., firewall logs, authentication logs, etc.). The log correlation engine 550 may then analyze the aggregated information to build a comprehensive model of the devices, services, and vulnerabilities in the network.

In one implementation, the network model that the log correlation engine 550 builds from the aggregated information may be used to identify various devices in the network that have registries containing information that may be relevant to auditing security or vulnerabilities in the network. For example, the network model may describe any devices in the network that have a remote registry service that can be used to access the registries on such devices, including any devices that have enabled or disabled the remote registry service, any devices that run operating systems that have default settings enabling or disabling the remote registry service (e.g., devices running Windows Vista™ may have a default setting that disables the remote registry service), or other information that may be relevant to performing remote registry service security audits. In particular, as noted above, the network model may generally describe services running on devices in the network, including information identifying operating systems that run on the devices in the network, which may provide information identifying devices running the operating systems known to have default settings that typically disable the remote registry service.

Figure 6:
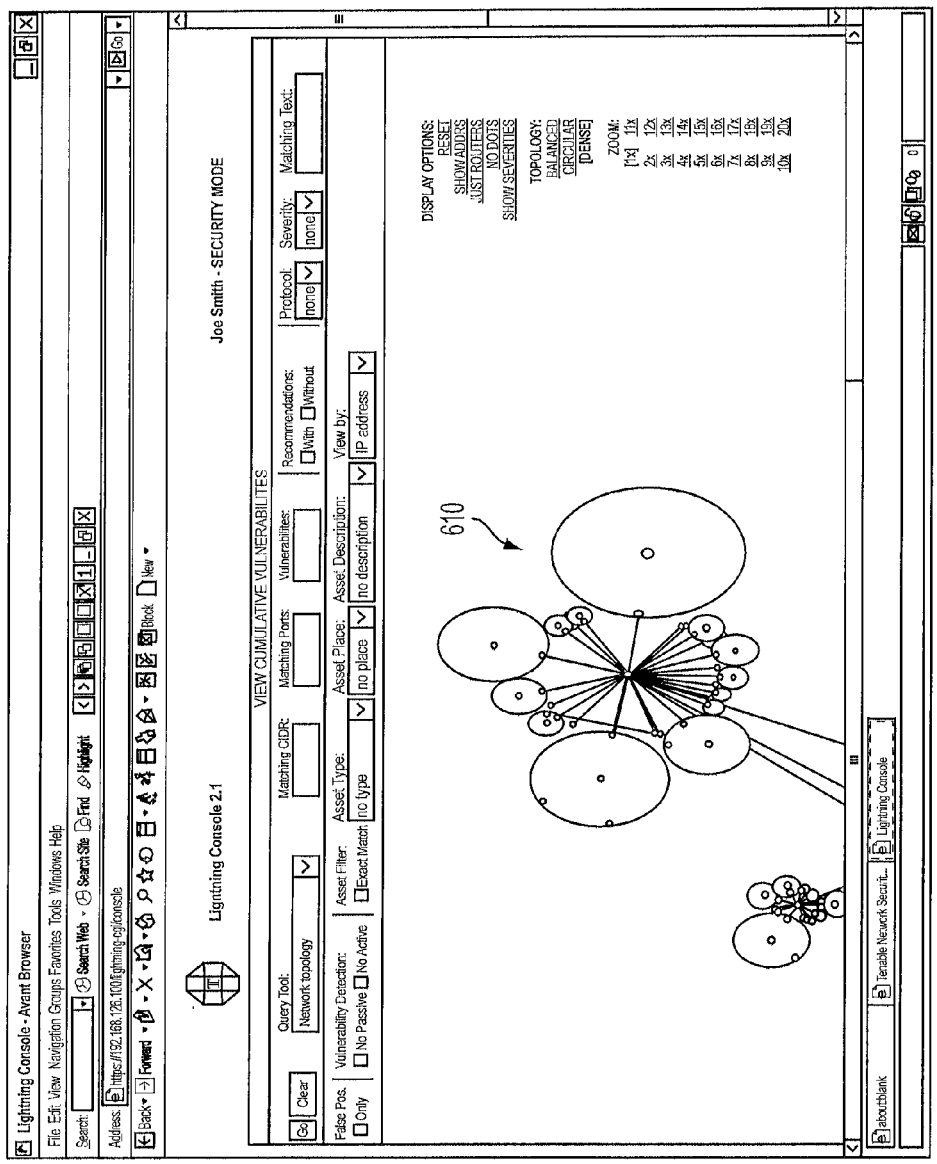

For example, FIG. 6 illustrates an exemplary screenshot showing a network model 610 that the log correlation engine 550 can build using the aggregated information, wherein the network model 610 may visually illustrate various devices, services, and vulnerabilities in the network, wherein the screenshot shown in FIG. 6 may include a user interface that can be used to configure portions of the network model 610 displayed therein (e.g., to display devices that have enabled or disabled the remote registry service, devices running operating systems having default settings that enable or disable the remote registry service, etc.). In particular, FIG. 7 illustrates an interface 700 that displays operating systems 710 actively detected in the network and operating systems 720 passively detected in the network. For example, the interface 700 displayed in FIG. 7 includes an empty list describing the operating systems 710 actively detected in the network and a populated list describing the operating systems 720 passively detected in the network.

Accordingly, in one implementation, the active, vulnerability scanners 510 and 520 may Identify any devices that have or likely have disabled the remote registry service from the network model prior to or during any particular active scan. In one implementation, the active vulnerability scanners 510 and 520 may then communicate one or more messages to the identified devices to temporarily enable the remote registry service on such devices prior to or during the active scan. The active vulnerability scanners 510 and 520 may then interact with the remote registry service on the identified devices to remotely obtain information from the registries on such devices that may be relevant to auditing security or vulnerabilities in the network and then communicate additional messages to disable the remote registry service on such devices in response to suitably obtaining the information needed from the registries. As such, temporarily enabling the remote registry service may enable the active vulnerability scanners 510 and 520 to obtain further information relevant to remote registry service security audits, while then disabling the remote registry service may leave the remote registry service in a state that can prevent malicious users from remotely accessing or otherwise manipulating the registries on such devices.

Figure 8:
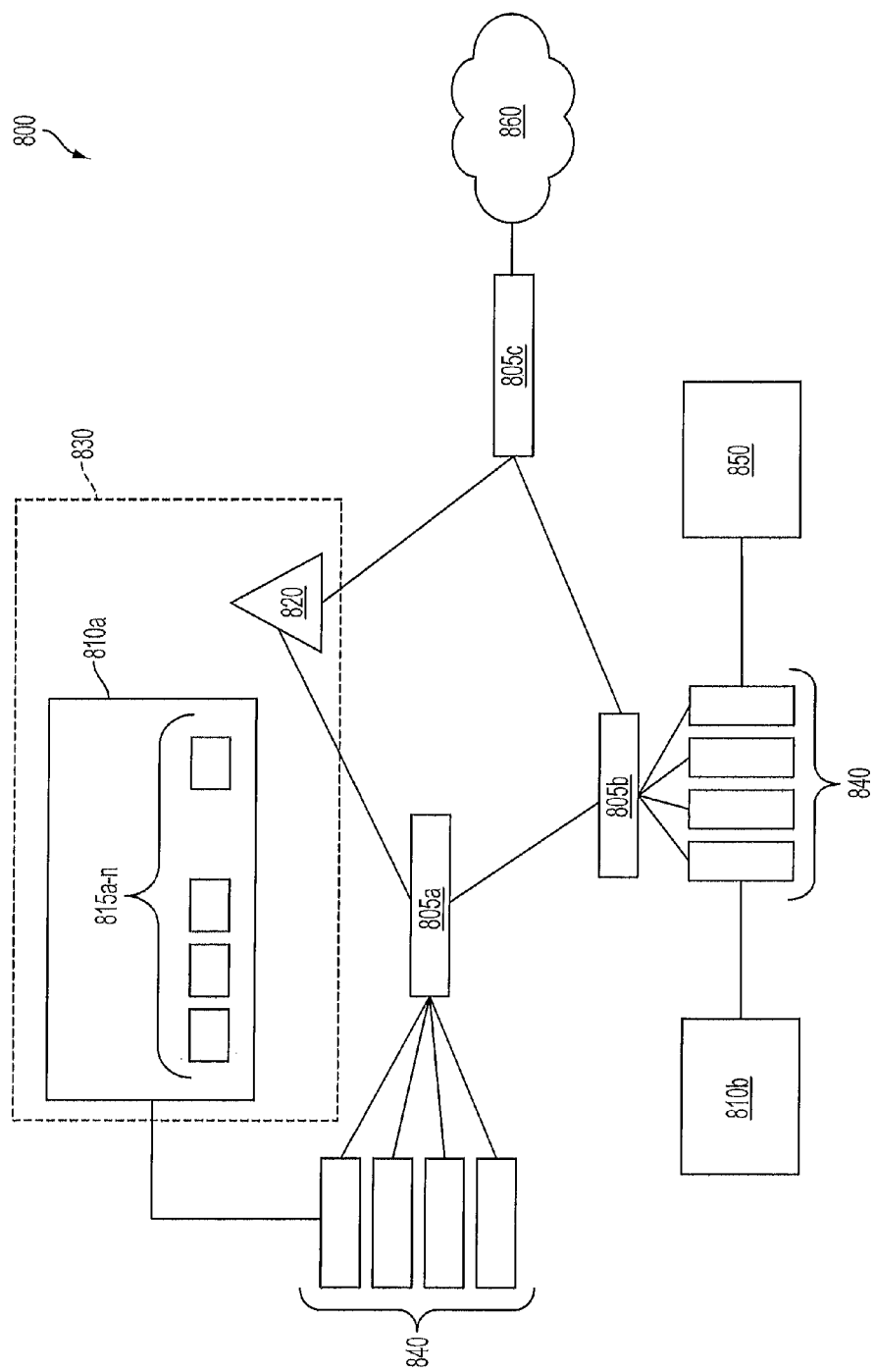
FIG. 8 illustrates another schematic diagram of the system for enabling remote registry service security audits, according to one aspect of the invention.

According to one aspect of the invention, FIG. 8 illustrates another schematic diagram of a network environment 830 that includes a system 830 for enabling remote registry service security audits. In particular, the network environment 830 shown in FIG. 8 may generally include one or more hosts or other hardware devices 840, one or more routers 805, one or more active vulnerability scanners 810, one or more passive vulnerability scanners 820, a log correlation engine 850, and an interface to a remote network 860. Furthermore, the network environment 830 may generally provide substantially similar functionality to the functionality described above in connection with FIGS. 2 through 5. Further, one or more of the active vulnerability scanners 810 shown in FIG. 8 (e.g., active vulnerability scanner 810) may include one or more plug-ins 815 that the active vulnerability scanners 810 may execute to perform credentialed scans that include automatically enabling and disabling a remote registry service running on any particular device 840 in the network 800.

In one implementation, the plug-ins 815 may generally include any suitable computer program modules, software, or other computer-executable instructions that can configure the active vulnerability scanners 810 to perform the credentialed scans that automatically enable and disable the remote registry service running on the devices 840. For example, one or more of the plug-ins 815 may be configured to discover one or more of the devices 840 that have disabled the remote registry service, one or more of the devices 840 that run operating systems having default settings associated with the remote registry service, or other information that may be relevant to remotely obtaining information from registries associated with one or more of the devices 840. Furthermore, one or more of the plug-ins 815 may temporarily enable the remote registry service on one or more of the devices 840 that have disabled the remote registry service or that run operating systems with default settings that disable the remote registry service and then disable the previously enabled remote registry service in response to suitably obtaining information needed from the registries on such devices 840. In addition, one or more of the plug-ins 815 may be configured to return error messages in response to failing in an attempt to enable the remote registry service for one or more of the devices 840 or failing in an attempt to subsequently disable the previously enabled remote registry service.

In one implementation, the plug-ins 815 may be customized to interact with the remote registry service associated with certain operating systems, customized to interact with registries certain devices 840, or otherwise customized based on criteria that may be relevant to remotely interacting with the registry on any suitable device 840 in the network. For example, in one implementation, certain operating systems (e.g., Windows XP, Windows 2003, Windows Vista, Windows 7, etc.) may have default settings that disable the remote registry service. Although the remote registry service may enable remote systems with proper credentials to access the registry of a particular device 840 that the remote systems may be auditing, the fully credentialed remote systems may nonetheless be unable to read information from the registry on the device if the device 840 does not have the remote registry service running. Thus, the plug-ins 815 may enable the active vulnerability scanner 810 to temporarily activate the remote registry service on the device 840, whereby the active vulnerability scanner 810 can then read keys, values, and other information from the registry on the device. Moreover, temporarily enabling the remote registry service may further permit the active vulnerability scanner 810 to perform file level checks, perform patch auditing, determine remote operating system versions, locate system files, or otherwise audit the device 840 using information in the registry.

In one implementation, the plug-ins 815 may further provide functionality that can be used to obtain and audit information in the registry without compromising security in the network 830. For example, certain organizations may have policies that restrict running the remote registry service on certain operating system platforms because activity originating from remote networks 860 could then improperly manipulate the registries on devices within the network 830 or because public or governmental regulations recommend disabling the remote registry service. Thus, the plug-ins 815 may be used to activate or enable the remote registry service temporarily (e.g., during an audit) and then return the remote registry service to a disabled state. Accordingly, the plug-ins 815 may enable the active vulnerability scanner 810 to obtain any information that may be needed from the registry during a period of time when the remote registry service has been temporarily disabled, while limiting security risks that may result from leaving the remote registry service enabled.

Further, in one implementation, the plug-ins 815 may enforce one or more change management policies that control whether certain changes to the network may or may not be permitted. For example, the change management policies may require certain privileges for any entity that requests a change to the remote registry service, wherein the active vulnerability scanner 810 may be assigned the required privileges to permit the active vulnerability scanner 810 to obtain information from the device registries. Further, because any attacker that has obtained the required privileges would then be able to obtain information from the device registries, the passive vulnerability scanner 820 may observe traffic in the network 830 to detect any activity that includes potentially unauthorized attempts to access the device registries. In addition, the policies may further cause the active vulnerability scanner 810 to perform a subsequent active scan to ensure that the remote registry services previously enabled on any devices 840 have been properly disabled, filter any events that describe changes to the remote registry services from logs forwarded to the log correlation engine 850, temporarily disable any tools that continuously monitor the network 830 to disable running instances of the remote registry service, or identify potential vulnerabilities that may result from a remote registry scan losing connectivity or otherwise terminating before the remote registry service has been disabled or deactivated, among other things.

Figure 9:
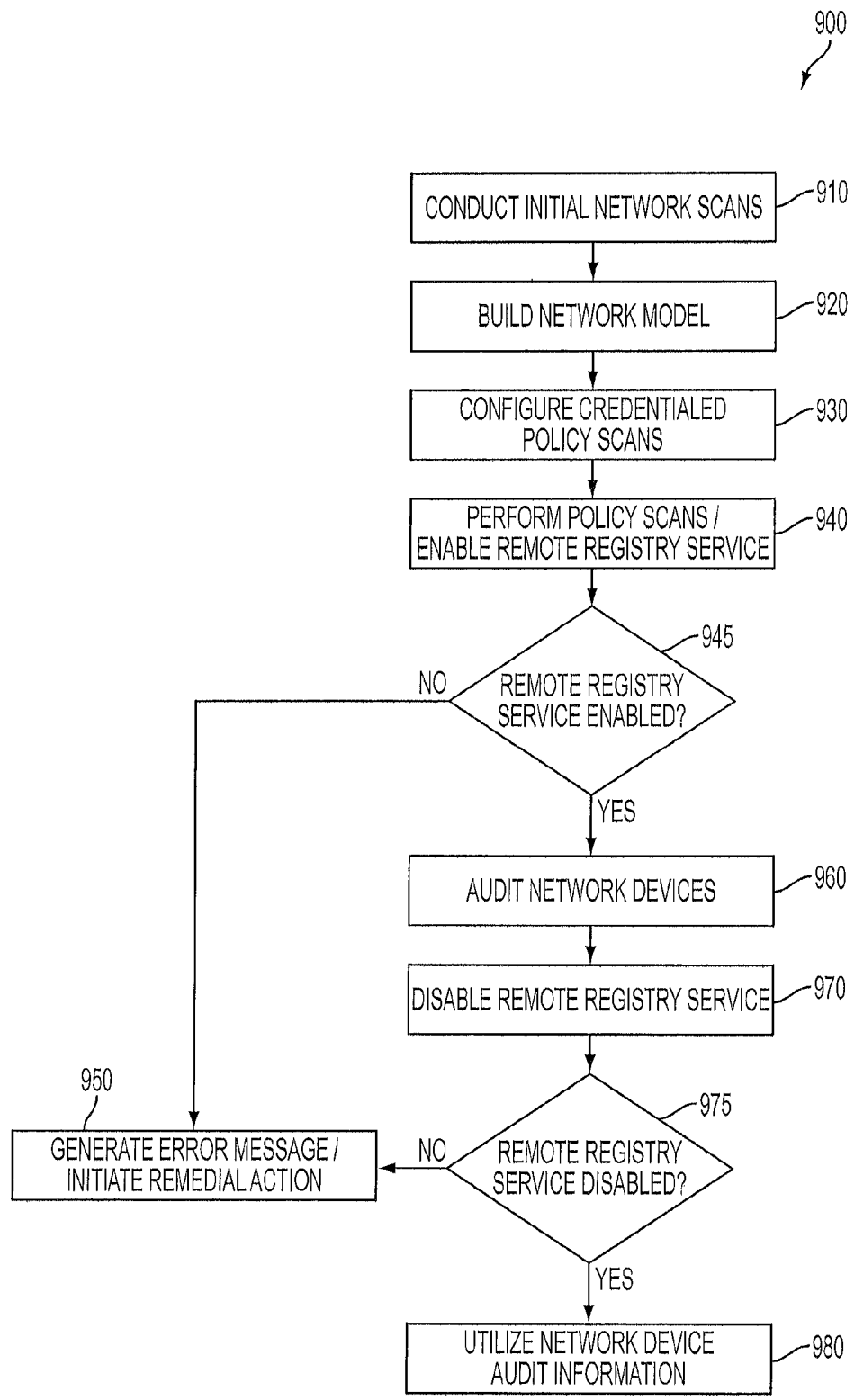
FIG. 9 illustrates an exemplary method for enabling remote registry service security audits, according to one aspect of the invention.

According to one aspect of the invention, FIG. 9 illustrates an exemplary method 900 for enabling remote registry service security audits. In particular, the method 900 shown in FIG. 9 may generally provide substantially similar functionality to the functionality described above in connection with FIG. 8 (e.g., the method 900 may generally provide functionality for temporarily enabling a remote registry service during a security audit and then disabling the remote registry service in response to suitably completing the security audit). For example, as will be described in further detail herein, the method 900 may be performed to temporarily enable the remote registry service on one or more devices in a network that have disabled the remote registry service (or devices that run operating systems with default settings that disable the remote registry service) and then disable the previously enabled remote registry service in response to suitably obtaining information needed from the registries on such devices.

For example, in one implementation, an operation 910 may include one or more active vulnerability scanners conducting an active scan in the network to discover various devices in the network, services running on the devices in the network, and vulnerabilities associated with the devices and services discovered in the network. In addition, operation 910 may further include one or more passive vulnerability scanners observing traffic in the network to discover devices actively communicating in the network, services actively running in the network, and vulnerabilities associated with the active devices and the active services discovered in the network. Thus, operation 910 may generally include conducting various active and passive scans in the network, which may be aggregated with various event logs that describe activity in the network (e.g., firewall logs, authentication logs, etc.).

In one implementation, an operation 920 may then include a log correlation engine analyzing the information aggregated during operation 910 to build a comprehensive model of the devices, services, and vulnerabilities in the network. Furthermore, in one implementation, the model may include information indicating whether certain devices in the network have a remote registry service, whether certain devices in the network run an operating system that typically has default settings associated with the remote registry service, and whether the remote registry service has been enabled or disabled on such devices, among other things. For example, as described in further detail above, the network model built in operation 620 may describe operating systems running on the devices discovered in the network, wherein certain operating systems may be known to have settings that automatically disable the remote registry service (e.g., Windows XP, 2003, Vista™, etc.). Thus, for any devices in the model that lack explicit information indicating whether the devices have a remote registry service that permits remote access to the registries on such devices, discovering the operating systems running on such devices can be used to extrapolate devices in the network that likely have disabled the remote registry service.

Thus, in one implementation, to enable the remote registry service security audits in the network, one or more credentialed policy scans may be configured in an operation 930. In particular, configuring the credentialed policy scans may include assigning permissions or other credentials to the active vulnerability scanner, whereby the credentials may permit the active vulnerability scanner to enable the remote registry service on any suitable device in, the network. For example, in one implementation, operation 930 may include loading one or more the plug-ins that the active vulnerability scanner can execute to temporarily enable, start, or otherwise activate the remote registry service on any devices in the network model discovered to have the remote registry service or an operating system that has default settings disabling the remote registry service. In addition, operation 930 may further include loading plug-ins that the active vulnerability scanner can execute to disable, stop, or otherwise deactivate the previously enabled remote registry service, determine whether or not the remote registry service has been properly enabled or disabled, and enforce policies to control permissions for changing a state of the remote registry service to enabled or disabled, among other things.

In one implementation, in response to operation 930 appropriately configuring the plug-ins, remote registry scanning preferences, or other criteria for the credentialed policy scans, the active vulnerability scanner may perform the credentialed policy scans in an operation 940. In particular, operation 940 may generally include the active vulnerability scanner enabling or starting the remote registry service on any suitable devices that have the remote registry service disabled or run operating systems that automatically disable the remote registry service. For example, in operation 940, the active vulnerability scanner may communicate one or more messages that can enable the remote registry service on such devices, wherein the remote registry service may then be enabled on such devices in response to determining that the active vulnerability scanner has the appropriate authorizations, permissions, or credentials. As such, an operation 945 may include determining whether the active vulnerability scanner failed to successfully enable the remote registry service on any of the devices, wherein an error message may be generated or remedial action may be initiated in an operation 950 in response to determining that the active vulnerability scanner failed to successfully enable the remote registry service on one or more of the devices.

Alternatively, in response to determining that the remote registry service was successfully enabled on each of the devices, an operation 960 may include a credentialed audit that scans or otherwise obtains information from the registries on the devices. For example, in one implementation, operation 960 may include the active vulnerability scanner interacting with the temporarily enabled remote registry services on the devices to read keys, values, and other information from the registries on the devices. Moreover, operation 960 may further include the active vulnerability scanner interacting with the temporarily enabled remote registry services to perform file level checks, audit patches, determine remote operating system versions, locate system files, or otherwise audit the devices using information contained in the registries. Thus, enabling the remote registry service in operations 940 and 945 may generally permit the active vulnerability scanner to remotely obtain information from the registries on the devices in the network, which may provide a more comprehensive understanding over the devices, services, and vulnerabilities in the network model.

Furthermore, in one implementation, various organizations may have security concerns over enabling the remote registry services or otherwise providing mechanisms to remotely access the registries on the devices in the network. In particular, remote scans that obtain information from the remote registry service may originate from external or otherwise unauthorized sources, whereby enabling the remote registry service may expose vulnerabilities in the network (e.g., because external, malicious, or unauthorized users may utilize information obtained from the registries to attack the network). As such, to prevent security vulnerabilities in the network, many public and governmental regulations recommend maintaining the remote registry service in a disabled state, while many organizations may define policies or default configurations adopting such recommendations. Thus, in one implementation, an operation 970 may address the potential security vulnerabilities that may be exposed from enabling the remote registry service.

For example, in response to operation 960 obtaining the registry information needed to audit the devices, operation 970 may include the active vulnerability scanner communicating one or more messages to disable the remote registry service on any devices that previously had the remote registry service enabled (i.e., in operation 940). As such, rather than leaving the remote registry service running or otherwise enabled, which may expose the network to security risks or other potential vulnerabilities, operation 960 may temporarily enable the remote registry service and operation 970 may then disable the remote registry service to close any security risks or other potential vulnerabilities that could otherwise result from leaving the remote registry service enabled. Furthermore, an operation 975 may then include determining whether the active vulnerability scanner failed to successfully disable the remote registry service on any device in the network.

For example, in one implementation, operation 975 may include the active vulnerability scanner performing a subsequent active scan to ensure that the remote registry services previously enabled on any devices have been properly disabled, determining whether lost connectivity or manual intervention terminated operation 960 prior to disabling the remote registry service in operation 970, or determining whether other criteria indicate that operation 970 failed to successfully disable the remote registry service. Thus, in response to determining that any of the devices in the network have the remote registry service in an enabled state, an operation 950 may include generating an error message or initiating remedial action to address the enabled state for the remote registry service (e.g., notifying a vulnerability management system that the enabled remote registry service may expose security risks, initiating action to disable the remote registry service, etc.).

In one implementation, whether the alert generated in operation 950 results in the remedial action may be analyzed in view of the network model or other knowledge of the network that can indicate whether or not to disable the remote registry service. For example, in response to a tool that continuously monitors the network to identify running instances of the remote registry service generating the alert in operation 950, the alert may be analyzed to determine whether the alert relates to a current remote registry service security audit (e.g., the alert may be discarded in response to determining that the remote registry service has been enabled on a device currently subject to the audit operation 960). In one implementation, in response to operation 975 verifying that the previously enabled remote registry services have been successfully disabled, an operation 980 may include utilizing the information gathered during the security audit in the manner described in further detail above. For example, because any attacker that has obtained the required privileges to modify the remote registry service could then use such privileges to enable the remote registry service and thereby improperly obtain information from the device registries, a passive vulnerability scanner may observe traffic in the network to detect any activity that potentially includes unauthorized attempts to access the device registries. Furthermore, the information gathered during the remote registry security audits may be integrated into the network model, whereby operation 980 may include filtering any events generated in the network that describe changes to the remote registry services, analyzing the information obtained from the device registries to identify vulnerabilities in the network, or updating the network model to describe the devices and services in the network with the information obtained from the registries, among other things.

In summary, the system and method described herein may generally include one or more active vulnerability scanners interrogating devices in the network to discover devices, services, and vulnerabilities in the network, and may further include one or more passive vulnerability scanners passively observing traffic in the network to supplement the information obtained from the active vulnerability scanners. Further, because discovering vulnerabilities in the network typically requires information from the registries associated with the devices in the network, the system and method described herein may model the devices that have disabled remote registry services or operating systems that typically disable the remote registry services. As such, the system and method described herein may temporarily enable or activate the remote registry service on such devices, interact with the enabled remote registry services enabled to obtain information from the registries on such devices, and then returning the remote registry services to a disabled state in response to obtaining the information needed from the registries. Further, as noted above, the active, and passive vulnerability scanners can be integrated with a log correlation engine or other components in a vulnerability management system to comprehensively analyze security vulnerabilities in the network.

Implementations of the invention may be made in hardware, firmware, software, or various combinations thereof. The invention may also be implemented as instructions stored on a machine-readable medium, which may be read and executed using one or more processing devices. In one implementation, the machine-readable medium may include various mechanisms for storing and/or transmitting information in a form that can be read by a machine (e.g., a computing device). For example, a machine-readable storage medium may include read only memory, random access memory, magnetic disk storage media, optical storage media, flash memory devices, and other media for storing information, and a machine-readable transmission media may include forms of propagated signals, including carrier waves, infrared signals, digital signals, and other media for transmitting information. While firmware, software, routines, or instructions may be described in the above disclosure in terms of specific exemplary aspects and implementations performing certain actions, it will be apparent that, such descriptions are merely for the sake of convenience and that such actions in fact result from computing devices, processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the invention, and the specification and drawings should therefore be regarded as exemplary only, with the scope of the invention determined solely by the appended claims.

What is claimed is:

1. A computer system for enabling remote registry service security audits for a plurality of devices in a network having a remote registry service, comprising:
    an active vulnerability scanner device configured to scan the network to detect a vulnerability in the network, wherein the active vulnerability scanner device is configured to:
        identify at least one of the plurality of devices in the network that has disabled the remote registry service;
        communicate an activation message to the at least one identified device, wherein the activation message enables the remote registry service on the at least one identified device;
        interact with the enabled remote registry service on the at least one identified device to obtain registry information; and
        communicate a deactivation message to the at least one identified device in response to obtaining the registry information, wherein the deactivation message disables the remote registry service on the at least one identified device.

2. The computer system of claim 1, wherein the activation message enables the remote registry service on the at least one identified device in response to the active vulnerability scanner device having at least one credential that controls whether the remote registry service can be modified on the at least one identified device.

3. The computer system of claim 1, wherein the active vulnerability scanner device is further configured to:
    interrogate the at least one identified device to determine whether the remote registry service has been disabled on the at least one identified device; and
    identify a potential vulnerability in the network in response to determining that the remote registry service has not been disabled on the at least one identified device.

4. The computer system of claim 1, wherein the active vulnerability scanner device is further configured to identify a potential vulnerability in the network in response to determining that the active vulnerability scanner device lost connectivity to the network prior to obtaining the registry information from the at least one identified device.

5. The computer system of claim 1, wherein the active vulnerability scanner device is further configured to identify a potential vulnerability in the network in response to determining that the active vulnerability scanner device was manually terminated prior to obtaining the registry information from the at least one identified device.

6. The computer system of claim 1, further comprising a passive vulnerability scanner device configured to observe traffic travelling across the network to detect unauthorized attempts to enable or disable the remote registry service on the at least one identified device.

7. The computer system of claim 1, wherein the active vulnerability scanner device is further configured to identify at least one of the plurality of devices that have disabled the remote registry service in response to determining that the at least one identified device runs an operating system having a default setting that disables the remote registry service.

8. The computer system of claim 1, wherein the registry information obtained from the at least one identified device includes at least one of keys, values, file levels, patches, remote operating system versions, or system file locations described in registries associated with the at least one identified device.

9. A method of enabling remote registry service security audits for a plurality of devices in a network having a remote registry service, comprising:
    identifying, by an active vulnerability scanner device configured to scan the network, at least one of the plurality of devices in the network that has disabled the remote registry service;
    communicating an activation message from the active vulnerability scanner device to the at least one identified device, wherein the activation message enables the remote registry service on the at least one identified device;
    interacting with the enabled remote registry service on at least one identified device, using the active vulnerability scanner device, to obtain registry information; and
    communicating a deactivation message from the active vulnerability scanner device to the at least one identified device in response to the active vulnerability scanner device obtaining the registry information, wherein the deactivation message disables the remote registry service on the at least one identified device.

10. The method of claim 9, wherein the activation message enables the remote registry service on the at least one identified device in response to the active vulnerability scanner device having at least one credential that controls whether the remote registry service can be modified on the at least one identified device.

11. The method of claim 9, further comprising:
    interrogating, by the active vulnerability scanner device, the at least one identified device to determine whether the remote registry service has been disabled on the at least one identified device; and
    identifying a potential vulnerability in the network in response to the active vulnerability scanner device determining that the remote registry service has not been disabled on the at least one identified device.

12. The method of claim 9, further comprising identifying, by the active vulnerability scanner device, a potential vulnerability in the network in response to determining that the active vulnerability scanner device lost connectivity to the network prior to obtaining the registry information from the at least one identified device.

13. The method of claim 9, further comprising identifying, by the active vulnerability scanner device, a potential vulnerability in the network in response to determining that the active vulnerability scanner device was manually terminated prior to obtaining the registry information from the at least one identified device.

14. The method of claim 9, wherein the active vulnerability scanner device identifies at least one of the devices that have disabled the remote registry service in response to determining that the at least one identified device runs an operating system having a default setting that disables the remote registry service.

15. The method of claim 9, wherein the registry information obtained from the at least one identified device includes at least one of keys, values, file levels, patches, remote operating system versions, and system file locations described in registries associated with the identified devices.

16. A non-transitory computer readable storage medium comprising a memory having instructions stored thereon for enabling remote registry service security audits for a plurality of devices in a network having a remote registry service, which instructions when executed by a processor cause the processor to implement:

an active vulnerability scanner configured to:
scan the network to detect a vulnerability in the network;
identify at least one of the plurality of devices in the network that has disabled the remote registry service;
communicate an activation message to the at least one identified device, wherein the activation message enables the remote registry service on the at least one identified device;
interact with the enabled remote registry service on the at least one identified device to obtain registry information; and
communicate a deactivation message to the at least one identified device in response to obtaining the registry information, wherein the deactivation message disables the remote registry service on the at least one identified device.

17. An active vulnerability scanner device comprising a processor, which when executing instructions stored in a memory of the active vulnerability scanner device, is configured to:

scan a network to detect a vulnerability in the network;
identify at least one of the plurality of devices in the network that has disabled the remote registry service;
communicate an activation message to the at least one identified device, wherein the activation message enables the remote registry service on the at least one identified device;
interact with the enabled remote registry service on the at least one identified device to obtain registry information; and
communicate a deactivation message to the at least one identified device in response to obtaining the registry information, wherein the deactivation message disables the remote registry service on the at least one identified device.

* * * * *